United States Patent
Lee et al.

(10) Patent No.: US 9,807,769 B2
(45) Date of Patent: Oct. 31, 2017

(54) METHOD FOR ELIMINATING INTERFERENCE BETWEEN CELLS IN WIRELESS COMMUNICATION SYSTEM AND APPARATUS THEREOF

(71) Applicants: Samsung Electronics Co., Ltd., Gyeonggi-do (KR); Korea University Research and Business Foundation, Seoul (KR)

(72) Inventors: Inkyu Lee, Seoul (KR); Sunghyun Moon, Seoul (KR); Changhee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/759,919

(22) PCT Filed: Jan. 8, 2014

(86) PCT No.: PCT/KR2014/000188
§ 371 (c)(1),
(2) Date: Jul. 8, 2015

(87) PCT Pub. No.: WO2014/109538
PCT Pub. Date: Jul. 17, 2014

(65) Prior Publication Data
US 2015/0358953 A1    Dec. 10, 2015

(30) Foreign Application Priority Data
Jan. 8, 2013    (KR) .................. 10-2013-0001895

(51) Int. Cl.
*H04W 4/00*    (2009.01)
*H04W 72/04*    (2009.01)
(Continued)

(52) U.S. Cl.
CPC .......... *H04W 72/046* (2013.01); *H04B 7/024* (2013.01); *H04B 7/24* (2013.01);
(Continued)

(58) Field of Classification Search
CPC .. H04J 11/0053; H04J 11/0056; H04W 8/005; H04W 4/023; H04W 72/048;
(Continued)

(56) References Cited

U.S. PATENT DOCUMENTS

2008/0219194 A1*  9/2008  Kim ............... H04B 7/0452
                                                    370/310
2008/0268834 A1   10/2008  Foschini et al.
(Continued)

FOREIGN PATENT DOCUMENTS

JP    2011-508527       3/2011
KR    10-2010-0027945   3/2010
(Continued)

OTHER PUBLICATIONS

Eduard A. Jorswieck et al., Complete Characterization of the Pareto Boundry for the MISO Interference Channel, Oct. 2008, IEEE Transaction on Signal Processing, vol. 56, No. 10, Abstract and p. 8, Section IV, Para (15) and Para (16).*
(Continued)

*Primary Examiner* — Shaq Taha

(57) ABSTRACT

A method for transmitting and receiving a signal of a terminal, according to an embodiment of the present invention includes the steps of: receiving a signal from a base station; calculating an expected value of the signal to interference plus noise ratio (SINR) based on the received signal; and choosing a beamforming method based on the expected value of SINR. The present invention can provide a method and an apparatus which apply adaptive ICIC in CoMP environment so as to maximize WSR with reduced
(Continued)

complexity of calculation, thus having a performance comparable to that determined by the conventional method, and providing the user with a smooth communication environment with improved quality. Furthermore, a terminal communicating with a base station chooses a desirable beamforming technique with reduced complexity so as to decrease the complexity of the system and to provide higher power efficiency with a faster calculation speed. Besides, it is possible for a base station to readily choose the user group and the beamforming technique group with the optimum communication environment.

16 Claims, 7 Drawing Sheets

(51) Int. Cl.
| | | |
|---|---|---|
| *H04B 7/24* | (2006.01) | |
| *H04W 72/08* | (2009.01) | |
| *H04L 25/02* | (2006.01) | |
| *H04B 7/024* | (2017.01) | |
| *H04L 1/00* | (2006.01) | |

(52) U.S. Cl.
CPC ............ *H04L 1/00* (2013.01); *H04L 25/0258* (2013.01); *H04W 72/082* (2013.01); *Y02B 60/50* (2013.01)

(58) Field of Classification Search
CPC ... H04L 5/0023; H04L 5/1469; H04L 5/0053; H04L 5/0073; H04L 5/0035–5/0057; H04B 7/04–7/08; H04B 7/0617; H04B 7/0452; H04B 7/0456; H04B 17/336

USPC ........................................................ 370/329
See application file for complete search history.

(56)  References Cited

U.S. PATENT DOCUMENTS

| | | | |
|---|---|---|---|
| 2011/0164576 A1* | 7/2011 | Vermani | ............... H04L 1/0003 370/329 |
| 2011/0182375 A1 | 7/2011 | Kim et al. | |
| 2015/0117237 A1* | 4/2015 | Wang | ..................... H04B 7/024 370/252 |

FOREIGN PATENT DOCUMENTS

| | | |
|---|---|---|
| KR | 10-2010-0089452 | 8/2010 |
| KR | 10-2011-0081887 | 7/2011 |

OTHER PUBLICATIONS

International Search Report dated Apr. 7, 2014 in connection with International Patent Application No. PCT/KR2014/000188, 4 pages.
Written Opinion of International Searching Authority dated Apr. 7, 2014 in connection with International Patent Application No. PCT/KR2014/000188, 4 pages.
Jun Zhang, et al., "Adaptive Spatial Intercell Interference Cancellation in Multicell Wireless Networks", IEEE Journal on Selected Areas in Communications, Dec. 2010, vol. 28, pp. 1455-1468.
Eduard A. Jorswieck, et al., "Complete Characterization of the Pareto Boundary for the MISO Interference Channel", IEEE Transactions on Signal Processing, Oct. 2008, vol. 56, pp. 5292-5296.

* cited by examiner

METHOD FOR ELIMINATING INTERFERENCE BETWEEN CELLS IN WIRELESS COMMUNICATION SYSTEM AND APPARATUS THEREOF

CROSS-REFERENCE TO RELATED APPLICATION(S)

The present application claims priority under 35 U.S.C. §365 to International Patent Application No. PCT/KR2014/000188 filed Jan. 8, 2014, entitled "METHOD FOR ELIMINATING INTERFERENCE BETWEEN CELLS IN WIRELESS COMMUNICATION SYSTEM AND APPARATUS THEREOF", and, through International Patent Application No. PCT/KR2014/000188, to Korean Patent Application No. 10-2013-0001895 filed Jan. 8, 2013, each of which are incorporated herein by reference into the present disclosure as if fully set forth herein.

TECHNICAL FIELD

The present invention relates to a method and an apparatus for improving performance with a low complexity in a wireless communication system, and more particularly, to a method and an apparatus for eliminating interference between a plurality of cells in a wireless communication system.

BACKGROUND ART

Recently, techniques for improving the performance of a mobile communication system by effectively processing interference between cells have been widely researched. The coordinated beamforming/coordinated scheduling (CS/CB) through sharing channel information without sharing data between base stations in a coordinated multiple point transmission/reception (CoMP) system may include adaptive inter-cell interference cancellation (hereinafter, referred to as "adaptive ICIC").

The adaptive ICIC provides a technique for properly choosing one of two techniques, i.e., single cell beamforming (MRT) and zero-forcing (ZF) beamforming (BF) instead of complicated beamforming techniques at the transmitting end.

However, the adaptive ICIC hardly considers interference resulting from scheduling of users in nearby cells in an environment in which a plurality of users belongs to a single cell. Moreover, consideration of the interference brings about an increase in calculation or data shared between the base stations.

DISCLOSURE OF THE INVENTION

Technical Problem

Therefore, the present invention has been made in view of the above-mentioned problems, and the present invention provides a method and an apparatus, which can implement the adaptive ICIC through a low complexity. In addition, the present invention provides a method and an apparatus that can maximize a weight sum-rate (WSR) and lower the complexity of the system in the CoMP environment.

Solution to Problem

In accordance with an aspect of the present invention, a method for transmitting and receiving signals in a terminal may include: receiving a signal from a base station; calculating an expected value of a signal to interference plus noise ratio (SINR) on the basis of the received signal; and choosing a beamforming method on the basis of the calculated expected value of the SINR.

In accordance with another aspect of the present invention, a terminal for transmitting and receiving signals may include: a transmitting/receiving unit that receives a signal from a base station; and a controller that calculates an expected value of a signal to interference plus noise ratio (SINR) on the basis of the received signal, and chooses a beamforming method on the basis of the calculated expected value of the SINR.

In accordance with another aspect of the present invention, a method for transmitting and receiving signals in a base station may include: transmitting a signal to one or more terminals; receiving a beamforming method chosen by one or more terminals on the basis of the transmitted signal; comparing terminals that can maximize the amount of transmission to the terminals according to the beamforming method chosen by one or more terminals; and choosing a beamforming method and a terminal on the basis of the comparison result.

In accordance with another aspect of the present invention, a base station for transmitting and receiving signals may include: a transmitting/receiving unit that transmits a signal to one or more terminals, and receives a beamforming method chosen by one or more terminals on the basis of the transmitted signal; and a controller that compares terminals that can maximize the amount of transmission to the terminals according to the beamforming method chosen by one or more terminals, and chooses a beamforming method and a terminal on the basis of the comparison result.

Advantageous Effects of Invention

The present invention provides a method and an apparatus, which can maximize the WSR with a low complexity of calculation by applying the adaptive ICIC in the CoMP environment, and can secure a performance comparable to that determined by the conventional method to thereby construct a smooth communication environment and provide the user with an enhanced quality communication environment.

In addition, a terminal communicating with a base station chooses a desirable beamforming technique with reduced complexity to lower the complexity of the system and to provide a high calculation speed and high power efficiency.

Furthermore, the present invention can allow the base station to readily choose a user group and a beamforming technique group, which have the optimum communication environment.

MODE FOR THE INVENTION

Figure 1:
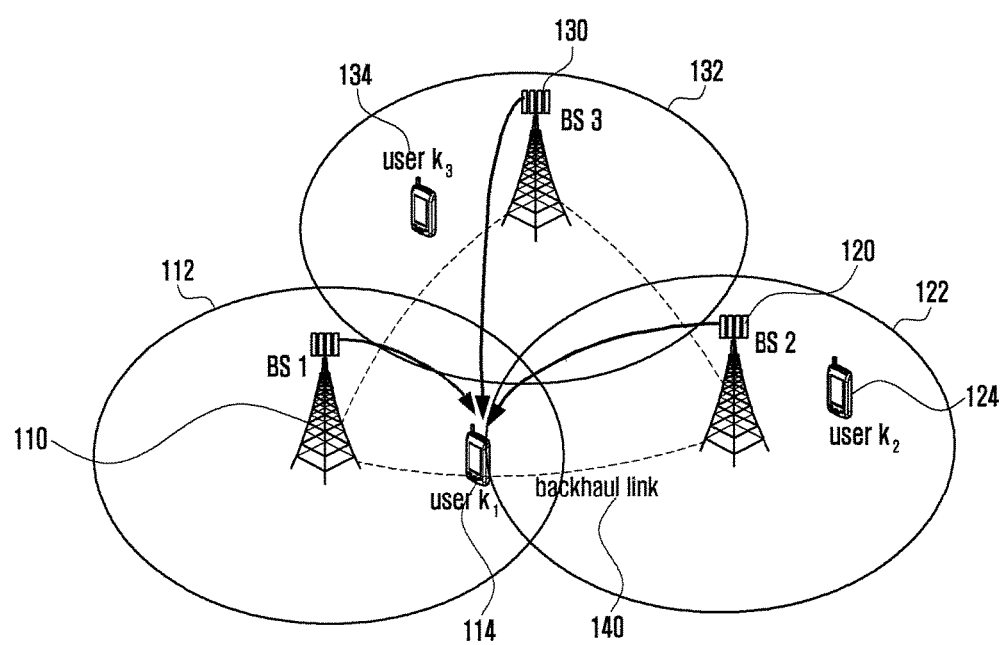
FIG. 1 illustrates a structure of a communication system according to an embodiment.

The embodiment of the present invention will be described in detail with reference to the accompanying drawings.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

FIG. 1 illustrates a structure of a communication system according to an embodiment.

Referring to FIG. 1, the first base station 110, the second base station 120, and the third base station 130 may transmit and receive signals to and from terminals in the first cell 112, the second cell 122, and the third cell 132, respectively. In addition, according to an embodiment, each base station may transmit and receive signals to and from terminals in other cells.

In addition, the first base station 110, the second base station 120, and the third base station 130 may be connected with each other through a backhaul link 140, and may share data with each other through the backhaul link 140. According to an embodiment, the shared data may include information that is received by the base station from the terminal, and the received information may include channel state information and a beamforming method chosen by the terminal.

In the embodiment, the first terminal 114, the second terminal 124, and the third terminal 134 may be located in the first cell 112, the second cell 122, and the third cell 132, respectively. Meanwhile, in the embodiment, the first base station 110, the second base station 120, and the third base station 130 may perform the CoMP with respect to the first terminal 114. At this time, a method for scheduling may be selected.

More specifically, FIG. 1 shows the system in which the number "L" of cells is three in the L-cell CoMP CS/CB system. At this time, it may be assumed that each base station has $N_t$ transmission antennas and communicates with K single-antenna users (terminals). However, the terminal, which communicates with the base station, is not limited to the single-antenna user, and the base station may communicate with terminals that use a plurality of antennas.

In addition, the base stations may exchange user channel state information (CSI). According to an embodiment, in order to reduce the amount of transmission of the backhaul link 140, the base stations may not share the data to be transmitted to the terminals.

The users may be distributed independently and randomly in the cell in each time slot. In addition, on the assumption that each base station supports a single user, and the kth user in the base station "n" is given as $k_n$, the reception signal of the user $k_n$ may be expressed as Equation 1 below.

$$y_{k_n} = \sqrt{\alpha_{k_n,n}} \bar{h}_{k_n,n}^H v_n s_{k_n} + \sum_{j=1, j \neq n}^{L} \sqrt{\alpha_{k_n,j}} \bar{h}_{k_u,j}^H v_j s_{k_j} + z_{k_n} \qquad \text{Equation 1}$$

Here, $v_n \in \mathbb{C}^{N_t \times 1}$ refers to a beamforming vector that satisfies $\|v_n\|^2 \leq 1$, and $s_{k_n}$ refers to a data sign in the base station "n." $\bar{h}_{k_n,j}$ denotes a channel from the user $k_n$ to the BSj, and $z_{k_n}$ denotes Gaussian noise. $a_{k_n,j}$ refers to the pathloss model by a distance. Additionally, $\sqrt{a_{k_n,j}} \bar{h}_{k_n,j}$ may be defined as $h_{k_n,j}$.

In addition, since the base stations are located in different places in the embodiment, it may be assumed that a receiving end detects a single user with a limitation of power in each base station.

In this case, the personal transmission rate $R_{k_n}$ of the user $k_n$ may be expressed as $R_{k_n} = \log_2(1 + \text{SINR}_{k_n})$, and SINRk$_n$ may express the reception SINR of the user $k_n$ as follows.

$$SINR_{k_n} = \frac{\|h_{k_n,n}^H v_n\|^2}{1 + \sum_{j \neq n}^{L} \|h_{k_n,j}^H v_j\|^2} \qquad \text{Equation 2}$$

The embodiment can maximize the weight sum-rate (WSR) performance in consideration of fairness of the user. In addition, provided that a group of L users selected by the base station refers to $K = \{k_1, \ldots, k_L\}$, the WSR, i.e., $R_w(\kappa)$ may be expressed as follows.

$$R_w(\kappa) = \sum_{n=1}^{L} w_k R_{k_n} \qquad \text{Equation 3}$$

Here, Wk$_n$ may be defined as a weight value coefficient, which may be preset in the base stations or may be determined according to circumstances.

According to an embodiment, the adaptive ICIC method may assume a single user in each base station. The base station may transmit a signal to the terminal without optimum loss and power adjustment at the transmitting end by assuming maximum power transmission on condition of $L \leq N_t$ in the communication system. In addition, the adaptive ICIC may allow the base station to properly choose one from two techniques, i.e., maximum ratio transmission (MRT) or zero forcing beamforming (ZFBF), according to the fading channel state and the location of the user on the basis of the local CSI of the terminal, which is measured in each base station, so that the communication performance can be improved.

To this end, in the case of a plurality of users in a single cell, the selection of an optimum beamforming group $S = \{s_1, \ldots, s_L\}$ and the selection of specific users from among a plurality of users in the cell should be performed. Therefore, since both the user group $\hat{\kappa} = \{\hat{s}_n\}_{n=1}^{L}$ and the technique group $\hat{S} = \{\hat{s}_n\}_{n=1}^{L}$ are to be chosen in order to maximize the WSR, the system complexity may increase. Now, the increase in the system complexity will be described.

$$(\hat{\kappa}, \hat{S}) = \underset{\kappa,S}{\operatorname{argmax}} R_W(\kappa, S) \qquad \text{Equation 4}$$

$$= \underset{\kappa,S}{\operatorname{argmax}} \sum_{n=1}^{L} w_{k_n} R_{k_n}(S)$$

The optimum value $(\hat{\kappa},\hat{S})$ of Equation 4 may be obtained by comparing the WSRs given by a combination of all of available users and the beamforming techniques.

The obtaining of the optimum value through a combination of all of the available users and the beamforming techniques has the complexity of $O(2^L K^L)$ in the form of an exhaustive search. Therefore, as K or L increases, the amount of calculation increases as well. In addition, since the base stations should share global CSI on all of the users in every transmission in order to calculate $R_w(\kappa,S)$ with respect to all $\kappa = \{k_n\}_{n=1}^{L}$, the backhaul links of limited transmission rates may bear excessive load. Meanwhile, although the embodiment in the case of L=3 adopts an ergodic sum-rate and does not need instant CSI exchange, since the calculation of the closed-form equation of the ergodic sum-rate is more complicated than the instant calculation of the transmission rate, as the number of users increases, the amount of calculation increases as well.

In addition, disregarding of small scale fading may bring about degradation of performance. Therefore, in order to improve the performance of the system by obtaining the value of Equation 4, it is required to reduce the CSI exchange between the base stations and to lower the complexity.

Accordingly, the embodiment may adopt the following procedure in order to conduct the adaptive ICIC with a lower complexity.

First, the terminal may choose a beamforming technique desired by the user using a simple critical point reference through SINR expected value analysis, and may feed the chosen beamforming technique back to the base station corresponding to the terminal.

In addition, the base stations may perform a sequential user scheduling algorithm in common in order to find the value $(\hat{\kappa},\hat{S})$ including an optimum user group and a beamforming group on the basis of the received feedback. The detailed description thereof will be made later.

Figure 2:
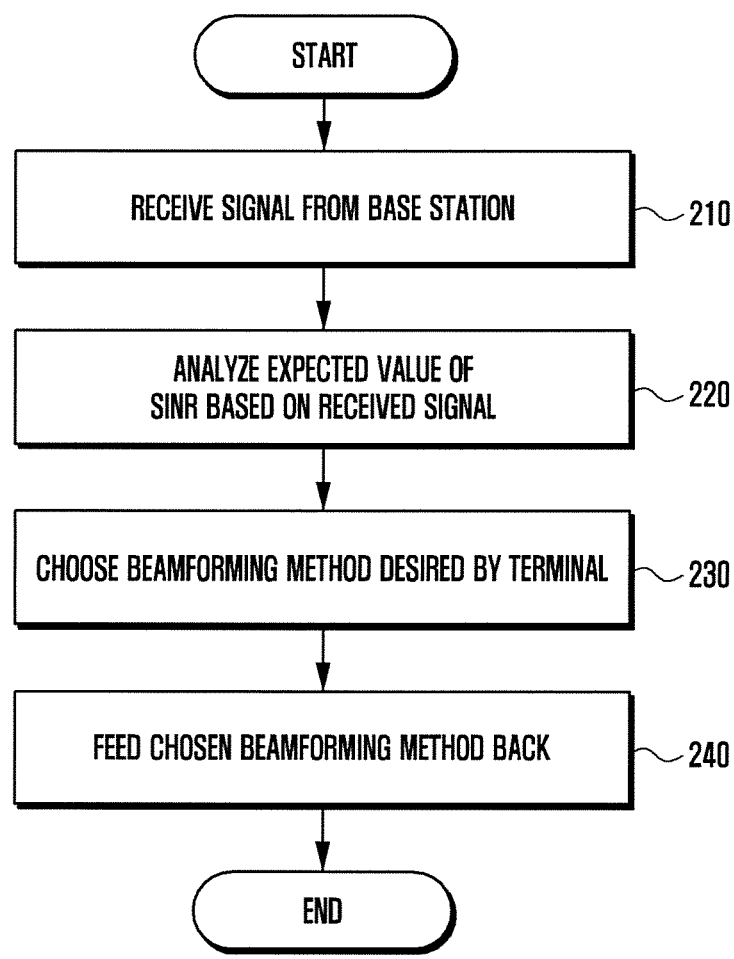
FIG. 2 is a flowchart illustrating the operation of a terminal according to an embodiment.

FIG. 2 is a flowchart illustrating the operation of a terminal according to an embodiment.

Referring to FIG. 2, the terminal may receive a signal from the base station in operation 210. The received signal may include a pilot signal or a control channel-related signal, and the signal is not limited thereto.

In operation 220, the terminal may calculate a signal to interference plus noise ratio (SINR) on the basis of the received signal. In the embodiment, the SINR may be made through SINR expected value analysis.

More specifically, in order for the terminal to analyze the SINR expected value in the embodiment, it may be assumed that the base station, which can make a coordinated transmission to the terminal, uses the same beamforming technique in each time slot.

$$S \triangleq S_1 = S = \ldots = S_L \qquad \text{Equation 5}$$

Without the assumption of Equation 5, in the case of L users who communicate with the base station, $2^L$ transmission modes may be configured. However, with the assumption of Equation 5, only two modes (s=MRT, or S=ZF) among the transmission modes may be considered.

Therefore, the beamforming technique group may be reduced to S={s}, and the selection of the beamforming technique group S may be binary selection to thereby lower the complexity of the adaptive ICIC.

In the case of analyzing the SINR expected value through the assumption of Equation 5, degradation of performance is not considerable, and this will be described in detail with reference to FIG. 5 later.

According to the embodiment, the beamforming technique of the user $k^n$ may be expressed as $Sk_n$, and the chosen $Sk_n$ may be fed back to the nth base station. The selection of $Sk_n$ that maximizes the transmission rate at each user end through the assumption of Equation 5 may be expressed as follows.

$$s_{k_n} = \arg \underset{s \in \{MRT, ZF\}}{\max} SINR_{k_n}(s) \qquad \text{Equation 6}$$

Here, $SINR_{k_n}(s)$ refers to the SINR of the user $k_n$ in the case where the same beamforming technique $s \in \{MRT, ZF\}$ is applied to all of the base stations. However, the user cannot know the beamforming techniques of the nearby base stations, and cannot know his or her own beamforming technique in the case of s=ZF, so it is difficult to estimate the actual $SINR_{k_n}(s)$ at the receiving end.

In this case, the users may use the SINR expected value analysis as a measure for the transmission/reception performance.

$$E[SINR_{k_n}(MRT)] \geq E[SINR_{k_n}(ZF)] \qquad \text{Equation 7}$$

If Equation 7 is satisfied, the user $k_n$ may choose the MRT, otherwise the ZFBF may be chosen. In the calculation above, the expected value may relate to only unknown beamforming vectors rather than all of the random variables.

If the beamforming technique is the MRT in the embodiment, the SINR expected value of the user $k_n$ for $\{v_j^{MRT}\}_{j \neq n}$ in Equation 2 may be approximately obtained using Jensen's inequality as follows.

$$E[SINR_{k_n}(MRT)] \approx \frac{|h_{k_n,n}^H v_n|^2}{1 + \sum_{j=1, j \neq n}^{L} E[|h_{k_n,j}^H v_j|^2]} = \frac{\|h_{k_n,n}\|}{1 + \frac{1}{N_t}\sum_{j \neq t}\|h_{k_n,j}\|^2} \qquad \text{Equation 8}$$

In addition, when the beamforming technique is the ZFBF in the embodiment, the interference term $\{v_j^{MRT}\}_{j \neq n}$ may be disregarded in Equation 2, so the SINR expected value may be given as follows.

$$E[SINR_{k_n}(ZF)] = \frac{\|h_{k_n,n}\|^2}{2(N_t - M + 1)} \qquad \text{Equation 9}$$

The reference suggested for the MRT technique selection from the beamforming of Equation 7 on the basis of Equation 8 and Equation 9 may be given as follows $$\Sigma_{j \neq n}\|h_{k_n,j}\|^2 \leq N_t(2N_t - 2L + 1) \triangleq \Gamma(N_t, L) \qquad \text{Equation 10}$$

According to the reference Equation, if the interference power is strong {greater than $\Gamma(N_t, L)$}, the user $k_n$ may desire the ZFBF. On the contrary, if the interference power is not greater than $\Gamma(N_t,L)$, the user $k_n$ may desire the support of the MRT.

In operation 230, the terminal may choose a desired beamforming technique through the expected value analysis of the SINR conducted in operation 220.

In operation 240, the terminal may feed the chosen beamforming technique back to the base station.

As described above, the user terminal may be operated in a manner of distribution using only his or her interference channel through the analysis of Equation 10 suggested by the assumption of Equation 6. In spite of that, the degradation of performance is not considerable, which will be described later.

In addition, the complexity of calculation of Equation 10 is lower than that of the conventional calculation by considering all of the beamforming techniques, so the complexity for choosing the beamforming technique of each user can be reduced. In addition, in the course of feeding the beamforming technique desired by each user back to the base station, only a single bit is additionally required to transfer the beamforming selection $Sk_n$ to the base station.

Figure 3:
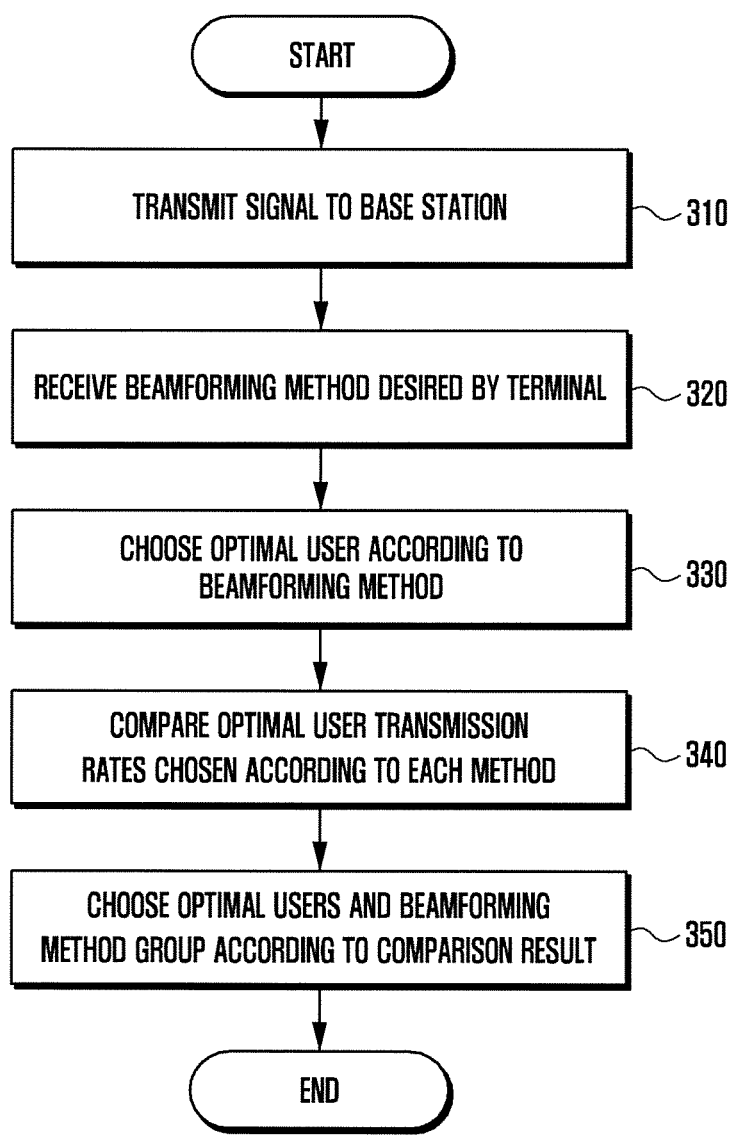
FIG. 3 is a flowchart illustrating the operation of a base station according to an embodiment.

FIG. 3 is a flowchart illustrating the operation of a base station according to an embodiment, and FIGS. 4a to 4c illustrate user distribution in each cell according to an embodiment.

Figure 4:
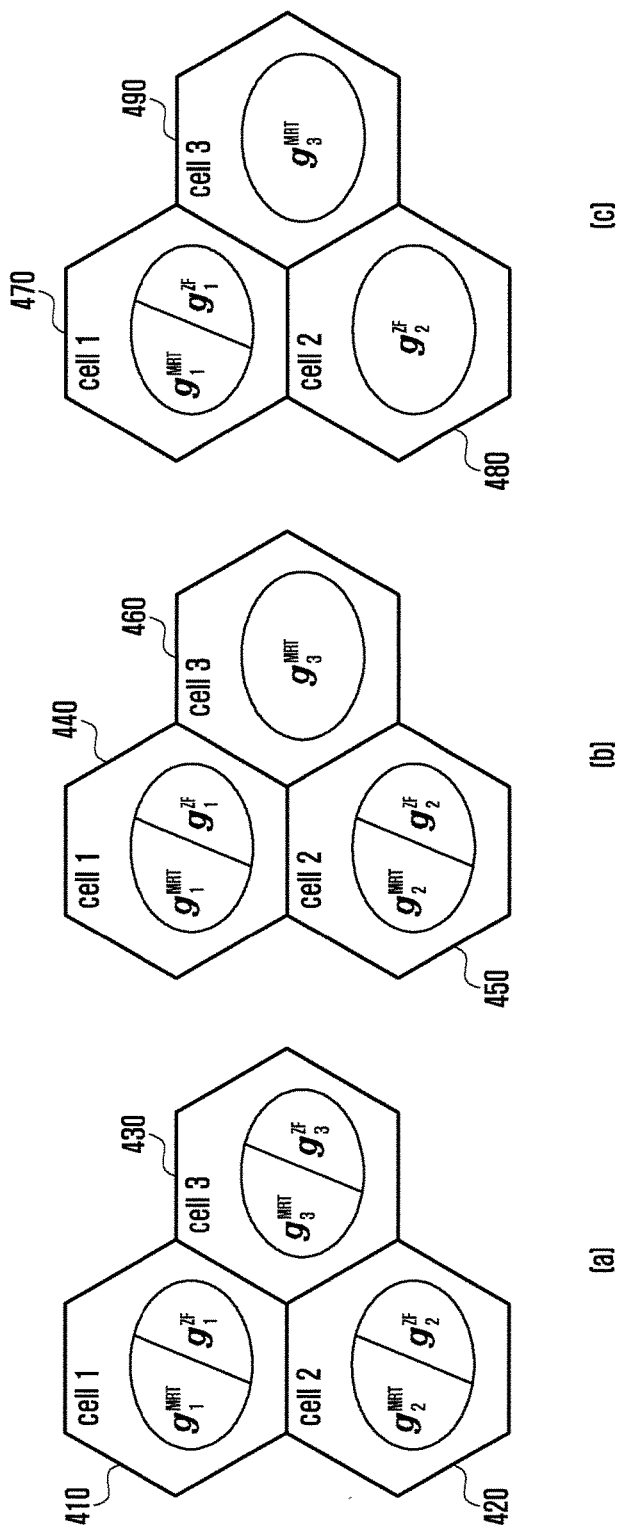
FIGS. 4a to 4c illustrate user distribution in each cell according to an embodiment.

Referring to FIGS. 3 and 4, the base station may transmit signals to the terminal in operation 310. The transmitted signals may include a pilot signal or a control channel-related signal, but the type of signal is not limited thereto.

In operation 320, the base station may receive a beamforming technique desired by the terminal from the terminal. The base station may receive the desired beamforming techniques from all of the terminals that can transmit and receive signals. In addition, according to the embodiment, the desired beamforming techniques may be chosen by the terminal through operations 220 and 230 of FIG. 2.

In operation 330, the base station may choose an optimum user with respect to each beamforming technique. Since all of the users who communicate with the base station have chosen the desired beamforming technique $Sk_n$, the base station (the index of the base station is "n") may divide the users into two groups on the basis of the feedback $Sk_n$ of the users. One is a group of the users who have fed $s_{k_n}$=MRT back, which is defined as $\eta_n^{MRT}$, and the other is a group of the users who have fed $s_{k_n}$=ZF back, which is defined as $G_n^{ZF}$. Therefore, two new groups replacing $\kappa=\{k_n\}_{n=1}^L$ may be defined as follows.

$$\kappa^{MRT} \triangleq \{k_n \in \eta_n^{MRT}\}_{n=1}^L, \quad \kappa^{ZF} \triangleq \{k_n \in G_n^{ZF}\}_{n=1}^L \quad \text{Equation 11}$$

The first cell 410, the second cell 420, and the third cell 430 in diagram (a) of FIG. 4 have two user groups, respectively. The two groups are the users who have chosen the MRT, and the users who have chosen the ZF.

Diagram (b) of FIG. 4 shows that some (the third cell 460 in the embodiment) of the first cell 440, the second cell 450, and the third cell 460 have chosen one beamforming technique, and diagram (c) of FIG. 4 shows that some (the second cell 480 and the third cell 490 in the embodiment) of the first cell 470, the second cell 480, and the third cell 490 have chosen one beamforming technique.

In diagram (b) of FIG. 4, all of the base stations may choose the MRT technique in order to support a single user whose degradation of performance is not considerable. On the contrary, in diagram (c) of FIG. 4, the base stations of the second cell 480 and the third cell 490 may hardly operate on the assumption of Equation 5, but the probability in which K is not too small may be very low.

The probability of occurrence of both $\eta_n^{MRT}=\phi$ and $G_n^{ZF}=\phi$ for certain "m" and "n" (m≠n) in L cells has the upper limit of $$\binom{M}{2}\left(\frac{1}{4}\right)^K.$$

Consequently, since this probability can be negligible, diagram (a) of FIG. 4 may be considered. With the division of the users above, Equation 4 may be rewritten as follows.

$$(\hat{\kappa}, \hat{s}) = \begin{cases} (\hat{\kappa}^{MRT}, MRT), & \text{if } R_w(\hat{\kappa}^{MRT}, MRT) \geq R_w(\hat{\kappa}^{ZF}, ZF) \\ (\hat{\kappa}^{MRT}, ZF), & \text{otherwise} \end{cases} \quad \text{Equation 12}$$

Here, $\hat{\kappa}^{MRT}$ and $\hat{\kappa}^{ZF}$ may be determined as follows.

$$\hat{\kappa}^{MRT} = \underset{\kappa^{MRT}}{\arg\max}\, R_W(\kappa^{MRT}, MRT) \quad \text{Equation 13}$$

$$\hat{\kappa}^{ZF} = \underset{\kappa^{ZF}}{\arg\max}\, R_W(\kappa^{ZF}, ZF) \quad \text{Equation 14}$$

Two optimum groups of $\hat{\kappa}^{MRT}$ and $\hat{\kappa}^{ZF}$ for each technique may be obtained using Equation 13 and Equation 14, respectively, on the basis of Equation 12.

In operation 340, the transmission rates of the optimum users chosen for each technique may be compared. That is, the WSRs of the users of the chosen user groups may be compared in order to determine the final value $(\hat{\kappa},\hat{S})$.

In this case, the overall search size to solve Equation 13 and Equation 14 may be still $O(K^L)$ at worst. Therefore, in the embodiment, the algorithm to reduce a search space may find the users at $\hat{\kappa}^{MRT}=\{\hat{k}_n^{MRT}\}_{n=1}^L$ and $\hat{\kappa}^{ZF}=\{\hat{k}_n^{ZF}\}_{n=1}^L$ in sequence in the base stations, respectively. To this end, the personal transmission rate of each user may be approximated on the basis of Equation 8 and Equation 9, as follows.

$$\tilde{R}_{k_n}(s) \triangleq \log_2(1+E[SINR_{k_n}(s)]) \quad \text{Equation 15}$$

In addition, the corresponding approximate WSR may be defined as follows.

$$\tilde{R}_w(\kappa, s) \triangleq \sum_{n=1}^L w_{k_n} \tilde{R}_{k_n}(s) \quad \text{Equation 16}$$

The operation of finding $\hat{\kappa}^{MRT}$ and $\hat{\kappa}^{ZF}$ using the approximation will be described in the following embodiment.

First, the embodiment for finding $\hat{\kappa}^{MRT}$ will be described. In L base stations in total, each base station may configure a cell.

1. Initialization: The nth base station may transmit $\{h_{k_n,n}\}_{k=1}^K$ to the $\hat{\kappa}^{MRT}$ mth base station (m≠n). The transmission may be made through the backhaul link.

2. Cell 1: The base station 1 may choose $\hat{k}_1^{MRT}$, which is expressed as follows, from among $\hat{\eta}_1^{MRT}$.

$$\hat{k}_1^{MRT} = \arg\max_{k_1 \in \eta_1^{MRT}} w_{k_1} \log_2(1 + E[SINR_{k_1}(MRT)])$$

In addition, the index, the weight, and the effective channel thereof may be transmitted to all of other base stations.

3. Cell L-1 in Cell 2: The nth base station may choose $\hat{k}_n^{MRT}$ that can maximize the WSR. Here, the WSR may be obtained as an approximate estimated value as follows.

$$\hat{k}_n^{MRT} = \arg\max_{k_n \in \eta_n^{MRT}} \left[ w_{k_n} \log_2(1 + E[SINR_{k_n}(MRT)]) + \sum_{j=1}^{n-1} w_{\hat{k}_j^{MRT}} \log_2\left(1 + E\left[SINR_{\hat{k}_j^{MRT}}(MRT)\right]\right) \right]$$

$$\text{with } E[SINR_{k_n}(MRT)] = \alpha_n^{k_n} \|h_n^{k_n}\|^2 / \left(1 + \frac{1}{N_t} \sum_{j \neq n} \alpha_j^{k_n} \|h_j^{k_n}\|^2\right)$$

In addition, user information on the obtained $\hat{k}_n^{MRT}$ may be transmitted to the remaining L-n base stations.

4. Cell L: The base station L may choose $\hat{k}_L^{MRT}$, which is expressed as follows, from among given $\{\hat{k}_n^{MRT}\}_{n=1}^{L-1}$ and user information thereof.

$$\hat{k}_L^{MRT} = \arg\max_{k_L \in \eta_L^{MRT}} R_w\left(\kappa^{MRT} = \{\hat{k}_n^{MRT}\}_{n=1}^{L-1} \cup \{k_L\}, MRT\right).$$

Next, the embodiment for finding $\hat{\kappa}^{ZF}$ will be described. In L base stations in total, each base station may configure a cell.

1. Cell n of n<L: The base station "n" may independently choose a ZFBF user having the best performance ($\hat{k}_n^{ZF} \in \mathcal{G}_n^{ZF}$) from among the group of all ZFBF users by maximizing $w_{k_n} \tilde{R}_{k_n}(ZF)$, and may report one or more of the user index, the weight, desirable $SCIh_{\hat{k}_n^{ZF},n}$, and leakage $CSIh_{\hat{k}_L^{MRT},L}$ thereof to the base station "L."

2. Cell L: Finally, the base station "L" may obtain $\hat{k}_L^{ZF}$ on the basis of the WSR, as follows.

$$\hat{k}_L^{ZF} = \arg\max_{k_L \in \mathcal{G}_L^{ZF}} R_w\left(\{\hat{k}_1^{ZF}, \ldots, \hat{k}_{L-1}^{ZF}, k_L^{ZF}\}\right)$$

The values of $\hat{\kappa}^{MRT}$ and $\hat{\kappa}^{ZF}$ may be determined by the scheduling sequence between the L base stations. However, the embodiment, in which the sequence is fixed, may expect the improvement of the performance.

$\hat{\kappa}^{MRT} = \{\hat{k}_n^{MRT}\}_{n=1}^L$ and $\hat{\kappa}^{ZF} = \{\hat{k}_n^{ZF}\}_{n=1}^L$ may be obtained through the procedure above. Finally, the optimum users and the beamforming technique group $(\hat{\kappa}, \hat{S})$ may be determined through comparison $R_w(\hat{\kappa}^{MRT}, MRT)$ and $R_w(\hat{\kappa}^{ZF}, ZF)$ in Equation 12.

The overall algorithm for the adaptive ICIC suggested in the embodiment has been described. By using the method according to the embodiment, the information exchange overhead between the nearby base stations can be reduced, compared with the conventional method. Second, since the number of candidate users in each base station is "k", the total search complexity for performing sequential scheduling in the base station is merely O(LC). On the contrary, the conventional method requires the complexity of $O(2^L K^L)$ for exhaustive search scheduling. Accordingly, the search complexity can be reduced by the method suggested in the embodiment.

FIGS. 5a and 5b illustrate the communication performance of a communication system according to an embodiment.

Figure 5:
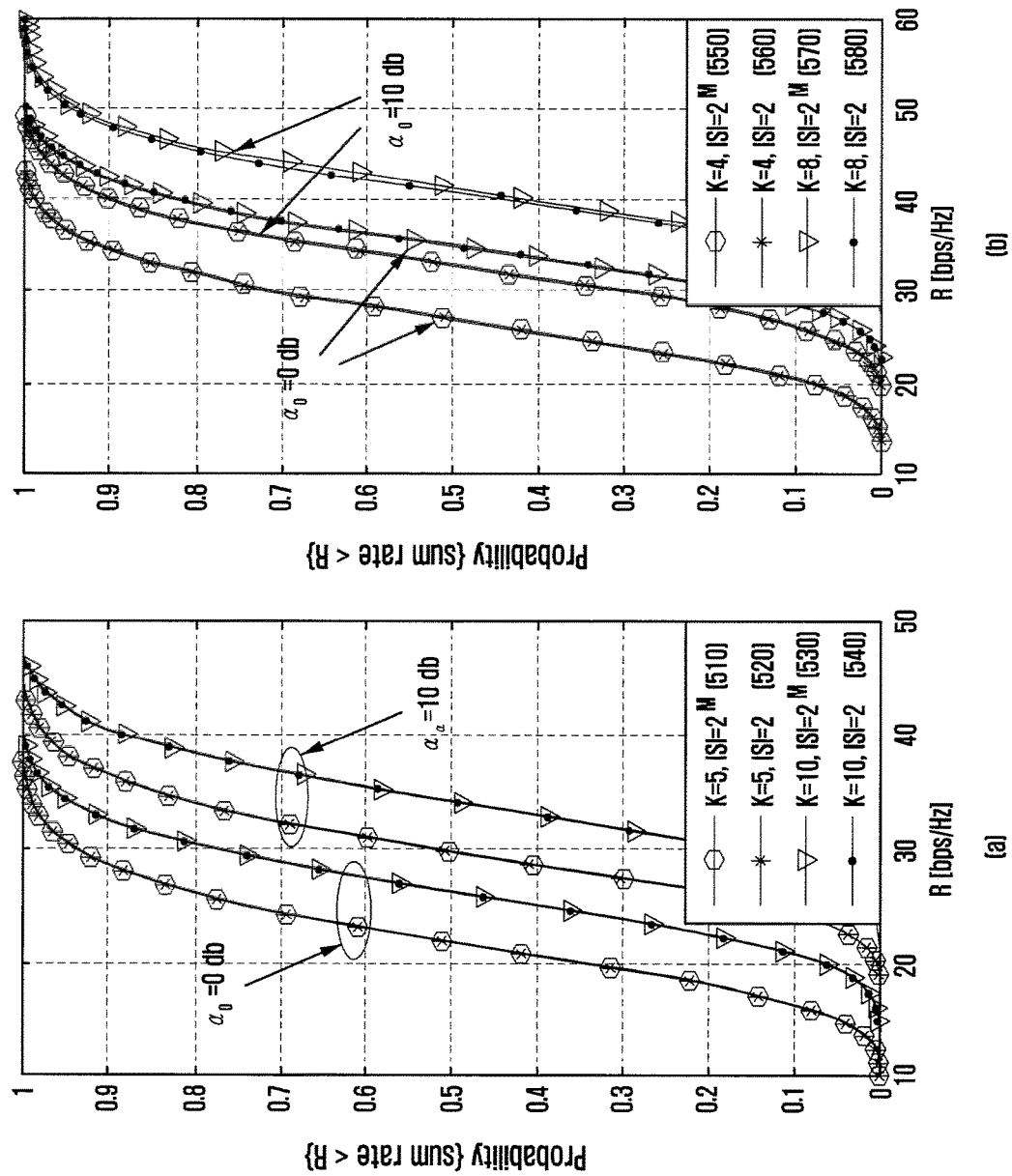
FIGS. 5a and 5b illustrate communication performance of a communication system according to an embodiment.

Referring to FIG. 5, the sum rate values for the typical example and Equation 5 are compared with each other.

The reference numeral 510 shows the case in which the beamforming techniques are differently chosen with respect to the users K=5 as the typical method. In addition, the reference numeral 520 shows the case where Equation 5 is applied to the users K=5.

The reference numeral 530 shows the case in which the beamforming techniques are differently chosen with respect to the users K=10 as the typical method. In addition, the reference numeral 540 shows the case where Equation 5 is applied to the users K=10.

The reference numeral 550 shows the case in which the beamforming techniques are differently chosen with respect to the users K=4 as the typical method. In addition, the reference numeral 560 shows the case where Equation 5 is applied to the users K=4.

The reference numeral 570 shows the case in which the beamforming techniques are differently chosen with respect to the users K=8 as the typical method. In addition, the reference numeral 580 shows the case where Equation 5 is applied to the users K=8.

Referring to the drawing, when Equation 5 is applied to a constant number of users, the degradation of performance is negligible because the optimum value $(\hat{\kappa}, \hat{S})$ of Equation 4 corresponds to the case where different techniques are used between different base stations, whereas the coordinated scheduler can find a group $(\kappa, S)$ of other auxiliary optimum values that always have the same performance (satisfy the assumption of Equation 5).

Figure 6A:
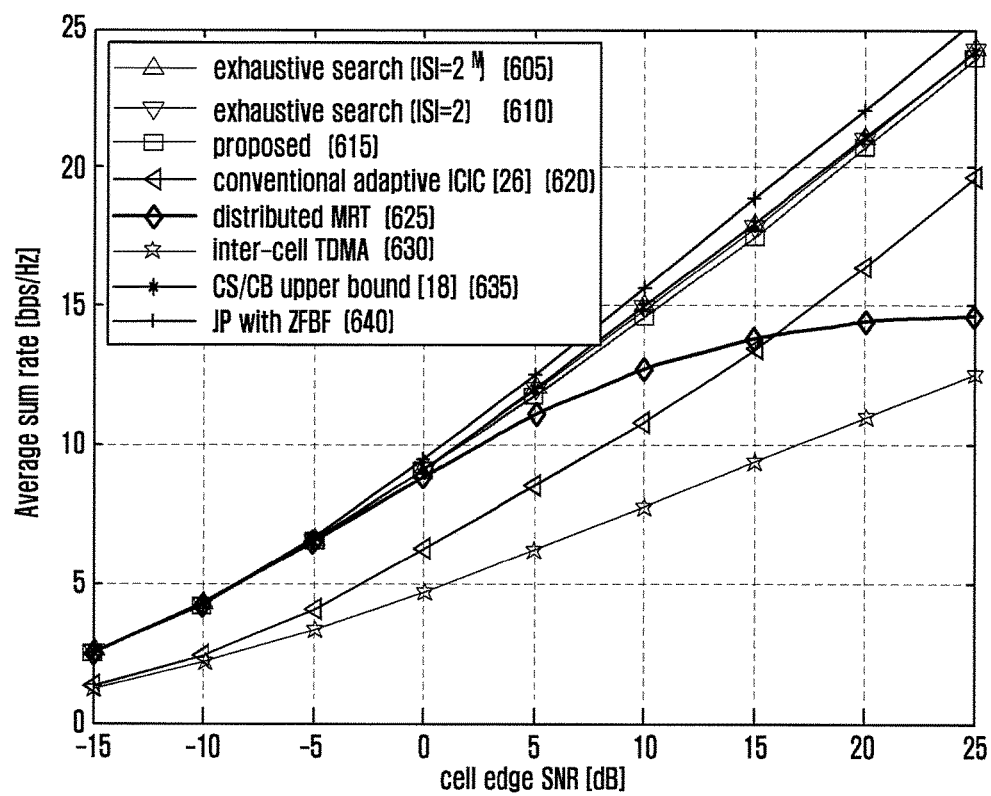
FIGS. 6a and 6b illustrate a comparison of performances between the present embodiment and other communication methods.
Figure 6B:
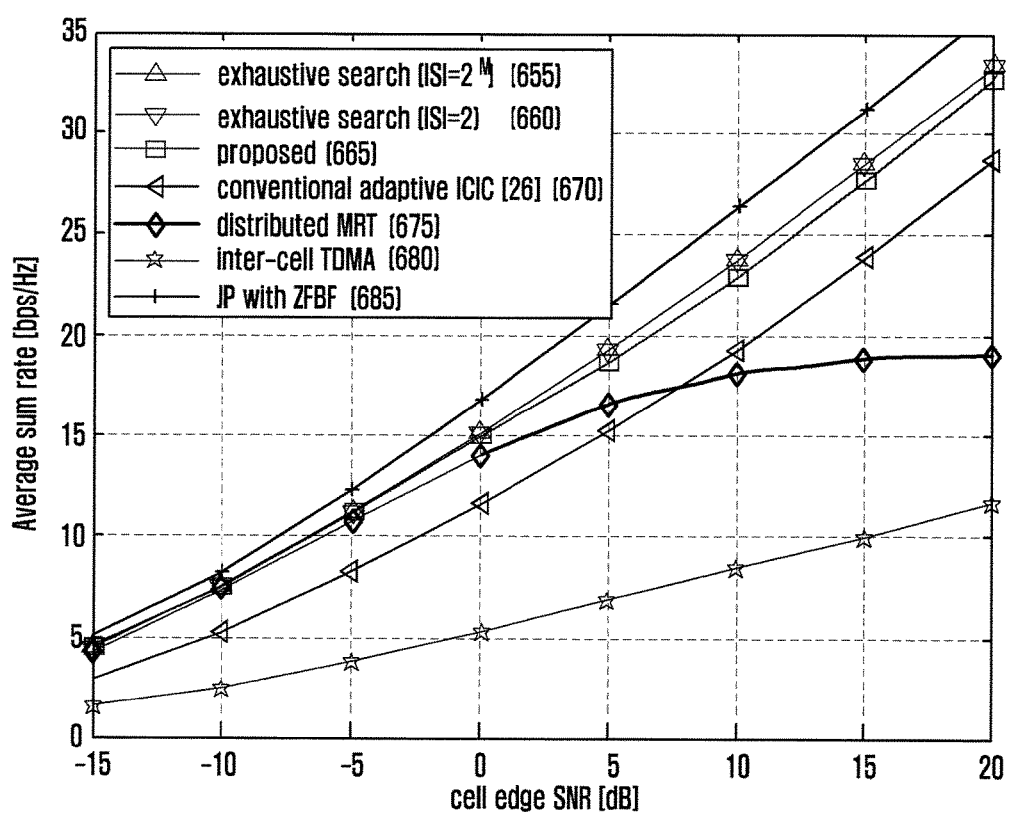

FIGS. 6a and 6b illustrate comparison of performance between the present embodiment and other communication methods.

Referring to FIGS. 6a and 6b, the improvement of the performance according to the embodiment can be confirmed by the following simulation result.

The experimental condition is as follows. The radius R of the cell is 0.5 km, and the users are distributed randomly and uniformly in the cell. The pathloss exponent is configured as $\beta = 3.75$, and the uncorrelated Rayleigh fading channel is used as small scale fading. The algorithm of proportional fair (PF) scheduling is used for calculating the user weight value.

The following CS/CB or joint processing (JP) technique is used in order to compare the performance of the suggested technique {the search size O(KL)}, as follows.

1. Optimal exhaustive search $\{O(2^L K^L)\}$: The technique in which all of available combinations in Equation 4 are considered in order to maximize the instant WSR.

2. Reduced set exhaustive search $\{O(2K^L)\}$: The technique in which the search space S is limited to be the same as Equation 5 (S={MRT} or {ZF}).

3. Conventional adaptive ICIC $\{O(2^L K^L)\}$: The technique by which the optimum $(\hat{\kappa}, \hat{S})$ is determined by comparing the ergodic WSRs.

4. CS/CB upper bound $\{O(K^L)\}$: The technique in which the system upper bound is obtained from Pareto optimal solution combined with exhaustive scheduling in the case of 2 cells.

5. Inter-cell time-division multiple access (TDMA) $(OK^L)$: The technique in which only a single cell supports the user who has the maximum weight value personal transmission rate in transmitting as a baseline technique.

6. JP with ZFBF {O($K^L$)}: The ZFBF technique through the maximum base station coordination and the exhaustive search. It may be considered as the upper bound in the case of 3 cells.

7. Distributed MRT {O(KL)}: Lastly, the technique to which the exhaustive distribution single cell technique and division user scheduling through the MRT beamforming are applied.

FIG. 6a shows the average sum-rate performance of a 2-cell network in the case of $N_t$=2 and K=30.

FIG. 6b shows the average sum-rate performance of a 3-cell network in the case of $N_t$=4 and K=20.

Although the technique suggested in the embodiment has a low complexity, it has the same throughput gain as the optimal technique such as the exhaustive search. The present invention suggests a simple adaptive ICIC technique that is comprised of two steps by which each base station performs scheduling of optimal users with an optimal beamforming technique in terms of maximizing the WSR in order to lower the calculation complexity in the common optimal technique. According to the suggested technique, in the case of a plurality of users, the complexity merely increases in a linear form, and a small backhaul bandwidth is required to have advantages in the actual communication environment.

In the embodiment, the base station and the terminal may have a transmitting/receiving unit that transmits and receives signals to and from other entities, and a controller that performs calculation on the basis of data transmitted and received through the transmitting/receiving unit.

Those skilled in the art can appreciate that it is possible to implement the present invention in another specific form without changing the technical idea or the indispensable characteristics of the present invention. Accordingly, it should be understood that the embodiments described above are merely exemplary and are not limited. The scope of the present invention is defined by the appended claims to be described later, rather than the detailed description. Accordingly, it should be appreciated that all modifications or variations derived from the meaning and scope of the appended claims and their equivalents are included in the range of the present invention.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method to transmit and receive signals by a terminal in a communication system, the method comprising:
    receiving a signal from a base station and at least one interference signal from at least one other base station;
    identifying a first expected value of a signal to interference plus noise ratio (SINR) in consideration that the signal and the at least one interference signal are transmitted based on a first beamforming scheme;
    identifying a second expected value of a SINR in consideration that the signal and the at least one interference signal are transmitted based on a second beamforming scheme;
    selecting a beamforming scheme for the terminal based on the first expected value of the SINR and the second expected value of the SINR; and
    transmitting the selected beamforming scheme to the base station,
    wherein the selected beamforming scheme is used to determine whether the first beamforming scheme or the second beamforming scheme maximizes a weight-sum rate (WSR) of the communication system.

2. The method of claim 1, wherein selecting the beamforming scheme for the terminal comprises selecting the beamforming scheme for the terminal based on a transmission rate of the terminal.

3. The method of claim 1, wherein the first beamforming scheme is a single cell beamforming maximum ratio transmission (MRT) scheme and the second beamforming scheme is a zero-forcing (ZF) beamforming scheme.

4. The method of claim 1, further comprising transmitting, to the base station, the selected beamforming scheme for the terminal.

5. A terminal to transmit and receive signals in a communication system, the terminal comprising:
    a transceiver configured to receive and transmit a signal; and
    a controller configured to:
    receive a signal from a base station and at least one interference signal from at least one other base station,
    identify a first expected value of a signal to interference plus noise ratio (SINR) in consideration that the signal and the at least one interference signal are transmitted based on a first beamforming scheme,
    identify a second expected value of a SINR in consideration that the signal and the at least one interference signal are transmitted based on a second beamforming scheme,
    select a beamforming scheme for the terminal based on the first expected value of the SINR and the second expected value of the SINR, and
    transmit the selected beamforming scheme to the base station,
    wherein the selected beamforming scheme is used to determine whether the first beamforming scheme or the second beamforming scheme maximizes a weight-sum rate (WSR) of the communication system.

6. The terminal of claim 5, wherein the controller is further configured to select the beamforming scheme for the terminal based on a transmission rate of the terminal.

7. The terminal of claim 5, wherein the first beamforming scheme is a single cell beamforming maximum ratio transmission (MRT) scheme and the second beamforming scheme is a zero-forcing (ZF) beamforming scheme.

8. The terminal of claim 5, wherein the controller is further configured to transmit, to the base station, the selected beamforming scheme for the terminal.

9. A method to transmit and receive signals by a base station in a communication system, the method comprising:
    transmitting a signal to a plurality of terminals;
    receiving information on a beamforming scheme selected by the plurality of terminals based on the transmitted signal; and
    selecting a beamforming scheme applied to the plurality of terminals that, based on the information, maximizes a weight-sum rate (WSR) of the communication system,
    wherein a beamforming scheme selected by a first terminal of the plurality of terminals is identified a first expected value of a signal to interference plus noise ratio (SINR) and a second expected value of the SINR,
    wherein the first expected value of the SINR is identified in consideration that a signal for the first terminal and at least one interference signal are transmitted based on a first beamforming scheme, and wherein the second expected value of the SINR is identified in consideration that the signal for the first terminal and the at least one interference signal are transmitted based on a second beamforming scheme.

10. The method of claim 9, wherein the beamforming scheme selected by the first terminal is selected based on a transmission rate of the first terminal.

11. The method of claim 9, wherein selecting the beamforming scheme comprises comparing two or more terminals of the plurality of terminals based on interference power measured by at least one of the two or more terminals.

12. The method of claim 9, wherein selecting the beamforming scheme comprises selecting the beamforming scheme based on a beamforming scheme selected by a nearby base station and information on a terminal related to the nearby base station.

13. A base station to transmit and receive signals in a communication system, the base station comprising:
a transceiver configured to transmit and receive a signal; and
a controller configured to:
transmit a signal to a plurality of terminals,
receive information on a beamforming scheme selected by the plurality of terminals based on the transmitted signal, and
select a beamforming scheme applied to the plurality of terminals that, based on the information, maximizes a weight-sum rate (WSR) of the communication system, wherein a beamforming scheme selected by a first terminal of the plurality of terminals is identified a first expected value of a signal to interference plus noise ratio (SINR) and a second expected value of the SINR, wherein the first expected value of the SINR is identified in consideration that a signal for the first terminal and at least one interference signal are transmitted based on a first beamforming scheme, and wherein the second expected value of the SINR is identified in consideration that the signal for the first terminal and the at least one interference signal are transmitted based on a second beamforming scheme.

14. The base station of claim 13, wherein the beamforming scheme selected by the first terminal is selected based on a transmission rate of the first terminal.

15. The base station of claim 13, wherein the controller is further configured to compare two or more terminals of the plurality of terminals based on interference power measured by at least one of the two or more terminals.

16. The base station of claim 13, wherein the controller is further configured to:
select the beamforming scheme based on a beamforming scheme selected by a nearby base station and information on a terminal related to the nearby base station.

* * * * *

UNITED STATES PATENT AND TRADEMARK OFFICE
CERTIFICATE OF CORRECTION

PATENT NO.       : 9,807,769 B2
APPLICATION NO.  : 14/759919
DATED            : October 31, 2017
INVENTOR(S)      : Inkyu Lee, Sunghyun Moon and Changhee Lee Page 1 of 1

It is certified that error appears in the above-identified patent and that said Letters Patent is hereby corrected as shown below:

On the Title Page

(73) Assignee should read: Samsung Electronics Co., Ltd., Suwon-si (KR); Korea University Research and Business Foundation, Seoul (KR)

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*